United States Patent [19]

van Gasse

[11] 4,287,310

[45] Sep. 1, 1981

[54] THERMOSETTING POWDER BASED ON AN UNSATURATED POLYESTER RESIN

[75] Inventor: René L. E. van Gasse, Opglabbeek, Belgium

[73] Assignee: Stamicarbon, B.V., Geleen, Netherlands

[21] Appl. No.: 144,647

[22] Filed: Apr. 24, 1980

[30] Foreign Application Priority Data

May 2, 1979 [NL] Netherlands ................. 7903429

[51] Int. Cl.$^3$ .............................................. C08L 67/00
[52] U.S. Cl. ........................................ 525/44; 525/27; 525/45; 525/49
[58] Field of Search ................... 525/44, 45, 49, 27

[56] References Cited

U.S. PATENT DOCUMENTS 3,926,902 12/1975 Bowen ................................. 525/45

Primary Examiner—J. Ziegler
Attorney, Agent, or Firm—Cushman, Darby & Cushman

[57] ABSTRACT

A thermosetting powder based on a homogeneous mixture containing 50 to 92% by weight of an unsaturated polyester resin having a softening temperature of at least 50° C. 50 to 30% bij weight of a prepolymer of a diallylester of an aromatic dicarboxylic acid, 3 to 20% by weight of a high boiling, crosslinking monomer and 0.1 to 5% by weight of hardening catalyst, all weight percentages relating to the overall quantity of the polymerizable components.

A process for the preparation of the thermosetting powder by melting and mixing the polyester resin and at least the greater part of the other polymerizable components except the catalyst subsequently the catalyst and the remaining portion of the polymerizable components is rapidly admixed to the melt at a temperature that is at least 20° lower than the temperature corresponding to a half life time of 1 minute in which operation the time during which the catalyst is exposed to the higher temperature is max. 30 sec. after which the mixture is rapidly cooled and ground.

5 Claims, No Drawings

THERMOSETTING POWDER BASED ON AN UNSATURATED POLYESTER RESIN

The invention relates to a thermosetting powder based on an unsaturated polyester resin having a softening temperature of at least 50° C. and a cross-linking monomer. Powders of this type are known for instance from Japanese Pat. No. 7313928, according to which a monomer is applied that consists of a monovinyl or monoallyl compound that is solid at room temperature. The physical properties of the cover layers obtained with the known powder are not quite satisfactory, however.

The object of the invention is to provide an improved thermo-setting powder. Such a powder can be used as a bonding agent and as a coating for objects obtained by hardening a moulding compound in a mould previously lined with the powder, or by hardening a thermosetting composition on a non-bonding substrate previously covered with the powder.

According to the invention, an improved powder consists of a homogeneous mixture containing 50 to 92% by weight of unsaturated polyester resin having a softening temperature of at least 50° C. according to ASTM D36-26, 5 to 30% by weight of a prepolymer of a diallylester of an aromatic dicarboxylic acid, 3 to 20% by weight of a high-boiling, cross-linking monomer, and 0.1 to 5% by weight of hardening catalyst, these weight percentages relating to the overall quantity of the polymerizable components mentioned.

A powder of the composition described above can be used to rapidly form hardening cover layers that excel in scratch resistance, and in resistance to local overheating, water, and domestic chemicals.

Preferably, the powder contains 57.5 to 84% by weight of unsaturated polyester resin with a softening temperature of, preferably, at least 70° C. according to ASTM D36-26, 7.5 to 25% by weight of a prepolymer of a diallylester of an aromatic dicarboxylic acid, 5 to 15% by weight of high-boiling monomer, and 1.0 to 2.5% by weight of catalyst. In addition to the above-mentioned components, the powder may contain homogeneously distributed pigments, release agents, fillers, hardening accelerators, flame-suppressing additives, and the like. The mean particle size may be between 0.005 and 0.20 mm. A mean particle size of between 0.01 and 0.15 mm is suitable for most purposes.

The application of the powder as a lining in moulds in which, or as a coating on surfaces on which, a hardenable composition is caused to harden, to produce an object provided with a cover layer, is described in Dutch patent application No. 7903428 filed simultaneously.

The powder can also be used to line the walls of a mould into which next a composition that can be hardened to a foam is introduced, to be hardened therein. When the mould is opened, the cover layer adheres to the foam. In this way it is possible to obtain objects of, e.g., polyurethane foam provided with a cover layer.

The powder can be sprayed pneumatically or electrostatically, or be distributed in another way. Pre-heated objects can be coated by immersing them in a fluidized bed of the powder.

The unsaturated polyester resin can be obtained by condensation of a dicarboxylic acid e.g. maleic anhydride, fumaric or itaconic acid with a diol containing 2-25 carbon atoms, preferably an aliphatic diol with 2-6 carbon atoms or a cycloaliphatic diol and/or and alkoxylated bisphenol-A, optionally with minor amounts of phthalic acid, isophthalic acid, adipic acid, or a chlorinated acid and aliphatic or cycloaliphatic polyol. The prepolymer may be any of the commercially obtainable, incompletely hardened, thermoplastic polymers from a diallylester of an aromatic carboxylic acid. Examples of these, at the temperatures of the proces meltable and soluble prepolymers are polydiallylisophthalate, polymers from diallylester of naphthalene dicarboxylic acid, and particularly polydiallylphthalate. Suitable as high-boiling cross-linking monomer are compounds with a boilingpoint above 200° C., in particular above 250° C. It is important that the monomer has a very low volatility at the temperature of the wall of the mould and accordingly a low vapour pressure, preferably less than 10 mm mercury (Hg) at 150° C. The meltingpoint of these monomers preferably lies above roomtemperature, 18° C. Suitable as crosslinking monomer are mono- and difunctional as well as and by preference trifunctional, allylgroups containing monomers. These are eligible from the group consisting of alkacrylates of polyfunctional alcohols, in particular acrylates, methacrylates and more particular triallylcyanurate and triallylisocyanurate. Eligible as catalysts are, e.g. per-acids, per-alcohols, ketoneperoxides, and per-esters. Very suitable are, e.g., benzoyl peroxide, tertiary butylperoxide, per-esters of benzoic acid, and per-esters of tertiary butanol.

By preference use is made of a catalyst having a high activity. The activity is preferably such that at a temperature of between 115° C. and 150° C. half of the quantity of catalyst decomposes in 1 minute. This can be referred to as a one-minute half-life value.

One aspect of the invention concerns the preparation of powders containing an active catalyst. According to this aspect of the invention, the catalyst is so admixed that a very large proportion of its activity is retained. This is achieved either by at once mixing into the melt the entire quantity of unsaturated polyester resin, prepolymer from a diallylester of an aromatic dicarboxylic acid, and cross-linking monomer, or by at first keeping part of the prepolymer and/or the cross-linking monomer apart and premixing it with the catalyst at a low temperature (preferably below 75° C.). Next, the catalyst, together with the remaining portion, if any, of the other components is added and rapidly admixed, in which operation the temperature should be at least 20° C. below the temperature at which the catalyst half-life value is 1 minute, and the time during which the catalyst is exposed to the higher temperature is max. 30 seconds. The exposition to the higher temperature takes place during the admixing till the rapid cooling. Preferably the catalyst is admixed at a temperature of between 85° and 110° C., with the time during which the catalyst is exposed to the higher temperature being max. 15 seconds. Such rapid mixing can be achieved for instance in a mixing extruder or in a static in-line mixer. The mixture containing the catalyst is cooled as rapidly as possible, e.g. on a cooled roller. The cooling rate is preferably at least 100° C. per minute. The solidified mixture may subsequently be ground to the desired particle size, preferably whilst being cooled.

The invention will be further explained in the following example, without being restricted to the mode of realization described therein.

EXAMPLE

A powder was prepared by mixing in a tumbler device 73 parts by weight of polyester resin having a softening point of 108° C. measured by the ring and ball method according to ASTM D36-26 (Synolite VG 441, of Synres Nederland), 18.5 parts by weight of diallylphthalate prepolymer (Dapon, by Osaka Ltd., Japan), and 2 parts by weight of zinc stearate. In a melting vessel 0.3 part of a 6% solution of cobalt octoate in 7.5 parts by weight of triallylcyanurate (meltingpoint 270° C., boiling-point over 250° C., vapour pressure at 150° C. 1 mm Hg) was admixed at 60° C. The mixture with the polyester contained in it (93.5 parts/h) was introduced into a mixing extruder (Buss co-kneader PR 100, type 7D), and there mixed with the mixture of triallylcyanurate and accelerator (7.8 parts/h), which was supplied halfway along the screw. Immediately before the nozzle, near the end of the screw, tert. butylperbenzoate (half life at 170° C. in one minute) was admixed at the rate of 1 part per hour. The mixture leaving the extruder after only some secunds, with a temperature of about 105° C., was rapidly cooled on a water-cooled cooling belt and processed to flakes. Whilst being cooled with liquid nitrogen, the flakes were ground to a powder having a mean particle size of between 0.03 and 0.08 mm.

I claim:

1. A thermosetting powder based on an unsaturated polyester resin having a softening temperature of at least 50° C. wherein said powder comprises a homogeneous mixture containing 50 to 92% by weight of unsaturated polyester resin, 5 to 30% by weight of a prepolymer of a diallylester of an aromatic dicarboxylic acid, 3 to 20% by weight of high-boiling, cross-linking monomer having a boiling point greater than 200° C. and a vapor pressure less than 10 mm mercury at 150° C., and 0.1 to 5% by weight of hardening catalyst, these weight percentages relating to the overall quantity of the abovementioned polymerizable components.

2. A thermosetting powder according to claim 1, wherein said powder contains 57.5 to 84% by weight of polyester resin, 7.5 to 25% by weight of a prepolymer of a diallylester of an aromatic dicarboxylic acid, 5 to 15% by weight of said high-boiling cross-linking monomer, and 1.0 to 2.5% by weight of said hardening catalyst.

3. A thermosetting powder according to claims 1 and 2, wherein said hardening catalyst has a half-life value of one minute at a temperature of between 115° C. and 150° C.

4. A process for the preparation of a thermosetting fiberless coating powder based on an unsaturated polyester resin having a softening temperature of at least 50° C. comprising the steps of:
   (a) admixing to a melt a homogeneous mixture consisting essentially of 50 to 92 weight percent of an unsaturated polyester resin, 5 to 30 weight percent prepolymer of a diallylester of an aromatic dicarboxylic acid, and from 3 to 20 weight percent of a high-boiling point, cross-linking monomer having a boiling point greater than 200° C. and a vapor pressure less than 10 mm mercury at 150° C., in the absence of the hardening catalyst; and
   (b) admixing to the mixture of step (a), the hardening catalyst and the remaining portion, if any, of the components other than the polyester resin at a temperature that is at least 20° C. lower than the temperature at which the half-life value of the hardening catalyst is 1 minute, in which operation the time during which the hardening catalyst is exposed to the higher temperature is a maximum of 30 seconds, after which the mixture is rapidly cooled and then ground.

5. A process for the preparation of a thermosetting powder according to claim 4, wherein said hardening catalyst is admixed at a temperature of between 85° and 110° C., with the time during which said hardening catalyst is exposed to the higher temperature being a maximum of 15 seconds.

* * * * *